US010942297B2

(12) United States Patent
Dross et al.

(10) Patent No.: US 10,942,297 B2
(45) Date of Patent: Mar. 9, 2021

(54) OPTICAL OUTPUT DEVICE AND DESIGN METHOD

(71) Applicant: SIGNIFY HOLDING B.V., Eindhoven (NL)

(72) Inventors: Oliver Dross, Waalre (NL); Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 274 days.

(21) Appl. No.: 16/099,225

(22) PCT Filed: May 11, 2017

(86) PCT No.: PCT/EP2017/061244
§ 371 (c)(1),
(2) Date: Nov. 6, 2018

(87) PCT Pub. No.: WO2017/198517
PCT Pub. Date: Nov. 23, 2017

(65) Prior Publication Data
US 2020/0319379 A1 Oct. 8, 2020

(30) Foreign Application Priority Data

May 19, 2016 (EP) ..................................... 16170275

(51) Int. Cl.
*G02B 3/00* (2006.01)
*F21V 5/00* (2018.01)
(Continued)

(52) U.S. Cl.
CPC ............ *G02B 3/0043* (2013.01); *F21V 5/004* (2013.01); *G02B 3/0056* (2013.01);
(Continued)

(58) Field of Classification Search
CPC .. G02B 3/0068; G02B 5/3083; G02B 17/002; G02B 27/10; G02B 3/0062;
(Continued)

(56) References Cited

U.S. PATENT DOCUMENTS 6,339,503 B1 1/2002 Derstine et al.
7,441,927 B1 10/2008 Kling
(Continued)

FOREIGN PATENT DOCUMENTS

EP 0598546 A1 5/1994
WO 2009065389 A1 5/2009

*Primary Examiner* — Brandi N Thomas
(74) *Attorney, Agent, or Firm* — Daniel J. Piotrowski

(57) ABSTRACT

An optical output device comprises a plate having at least one surface formed as an array of tessellated lenses. The tessellated lenses comprise at least first and second regions of regular hexagonal lens tessellation, wherein the first and second regions are slanted with respect to each other. By removing full periodicity in this way, but maintaining localized periodicity, visible non-uniformities are reduced in both color and intensity. The optical output device does not need to be illuminated uniformly to generate an output without visible intensity or color edges.

15 Claims, 3 Drawing Sheets

(51) Int. Cl.
*G02B 27/00* (2006.01)
*G02B 27/30* (2006.01)

(52) U.S. Cl.
CPC ......... *G02B 27/0012* (2013.01); *G02B 27/30* (2013.01); *G02B 2003/0093* (2013.01)

(58) Field of Classification Search
CPC ............ G02B 5/0263; G02B 2207/101; G02B 26/0833; G02B 27/0012; G02B 30/56; G02B 3/0012; G02B 3/0056; G02B 3/08; G02B 5/0252; G02B 5/0278; G02B 5/10; G02B 5/188; G02B 5/1895; G02B 5/22; G02B 5/3008; G02B 5/3033; G02B 13/00; G02B 13/24; G02B 27/283; G02B 5/021; G02B 5/0268; G02F 1/13363; G02F 1/1393; G02F 1/133526; G02F 1/133621; G02F 2001/133742; G02F 2001/136222; G02F 2202/40; G02F 1/133634; G02F 1/136209; G02F 2001/133623; G02F 2201/40; G02F 2203/03; G02F 2413/02; G02F 2413/05; G02F 2413/11; G02F 2413/12; G02F 1/133603; G02F 1/133605; G02F 1/133606; G02F 1/133608; G02F 1/133611; G02F 2001/133607; G02F 2001/133637

See application file for complete search history.

(56) References Cited

U.S. PATENT DOCUMENTS

| | | |
|---|---|---|
| 2003/0002871 A1 | 1/2003 | Ohmura |
| 2004/0130790 A1 | 7/2004 | Sales |
| 2005/0063064 A1 | 3/2005 | Becker et al. |
| 2005/0180690 A1 | 8/2005 | Sugiyama et al. |
| 2015/0131034 A1 | 5/2015 | Cho et al. |
| 2016/0265740 A1* | 9/2016 | Booij ..................... G02B 27/30 |
| 2019/0179072 A1* | 6/2019 | Muschaweck ....... G02B 6/0008 |

* cited by examiner

OPTICAL OUTPUT DEVICE AND DESIGN METHOD

CROSS-REFERENCE TO PRIOR APPLICATIONS

This application is the U.S. National Phase application under 35 U.S.C. § 371 of International Application No. PCT/EP2017/061244, filed on May 11, 2017 which claims the benefit of European Patent Application No. 16170275.8, filed on May 19, 2016. These applications are hereby incorporated by reference herein.

FIELD OF THE INVENTION

This invention relates to an optical output device for beam shaping the light output from a light source. It relates for example to the light exit surface of a lamp or a part of a light collimator.

BACKGROUND OF THE INVENTION

It is well known to use arrays of small lenses (often called lenslets or microlenses) to provide a light output function. Such a lens array may be used at the output of a collimated light source. Indeed, many collimators make use of diffusers or microlens arrays on a separate window element or integrated in an exit surface of a dielectric collimator. The purpose is to provide adjustment of the beam angle, and/or to dilute color artifacts, especially when used with mid power LEDs (or RGB LEDs), and/or to eliminate or smooth out intensity artifacts.

It is known to use periodic arrays of lenses, for example forming a square or hexagonal grid, on one side of a transparent plate. Alternatively, double-sided integrating lens pairs may be used. Integrating lens pairs are however particularly prone to create polygonal artifacts at the edge of the pattern, as the light distribution is a superposition of relatively sharp images of the outline of the lenses of the first array.

Hexagonal or square lens arrays produce hexagonal or square artifacts in the beam. For example, a single spherical lens, when illuminated with parallel light, creates an intensity distribution similar to a flat top shape with sharp slopes. If such lenses are tessellated, part of each lens is cut off so that the intensity distribution of a tessellated lens takes on the same shape as the lens, and therefore has sharp gradients at the edge. This is often unwanted and not optimal for beam shaping and color mixing, as round artifact-free beams are preferred.

The problem has been recognized, and some partial solutions exist. For example, U.S. Pat. No. 7,441,927 discloses as prior art a rotationally symmetric spiral pattern, and discloses as the new design a tessellation design which removes rotational symmetry. It is based on a phyllotactic spiral pattern. This design however can cause artifacts if not illuminated evenly everywhere.

FIG. 1 shows the design of U.S. Pat. No. 7,441,927. If the design is illuminated by multiple light sources, the output beam shape is not round, as shown by the ray trace image in FIG. 2. This is based on modeling the output from the lens design when illuminated by four separate collimators.

Thus, there is a problem with periodic tessellations and also with many known irregular lens tessellations that visible color or intensity non-uniformities are created. Known irregular lens tessellations which attempt to address this problem may produce smooth round beams when illuminated uniformly, but they may still create artifacts when illuminated with multiple light sources, for example an array of collimators.

There is therefore a need for a lens design which enables artifact-free output from a light source or multiple light sources and which is able to provide desired beam shaping or beam steering.

SUMMARY OF THE INVENTION

The invention is defined by the claims.

According to examples in accordance with an aspect of the invention, there is provided an optical output device for receiving incident light and providing output light, comprising:

a plate having a first main surface for receiving the incident light and a second opposing surface (56) for providing the output light, wherein at least one of the first and second surfaces comprises a tessellated surface of tessellated lenses, wherein the tessellated lenses comprise at least first and second regions wherein within each region all hexagons are regular hexagons of the same size and the same angular orientation with respect to each other, wherein the first and second regions have a relative rotation θ between them, of the lenses about a normal to the tessellated surface, with 0<θ<30 degrees, wherein the first and second regions are randomly aligned with respect to each other, and wherein each region comprises at least seven tessellated lenses.

This design provides regions of regular hexagonal tessellation, but with the regions rotated relative to each other. Note that a relative rotation of below 30 degrees in either angular direction means there is a relative angle of up to 60 degrees in one angular direction. This closest relative angle of less than 30 degrees (and greater than zero), means that one hexagonal pattern is slanted relatively to the other by any amount. Because this definition allows relative rotation is allowed in either angular direction, the relative rotational angle is the smallest angle between a side of one hexagonal pattern and the most aligned side of the other hexagonal pattern. By creating many such rotated regions, thus removing full periodicity, visible non-uniformities are reduced in both color and intensity. It also means the optical output device does not need to be illuminated uniformly to generate an output without visible intensity or color edges. Any desired outer shape may be obtained of the light output.

The tessellation of lenses may be considered analogous to a polycrystalline structure, with local regions of regular crystalline structure, and with multiple such local regions but with different (e.g. random) alignments of the local crystalline structures with respect to each other.

The lenses, for example, may have a flat surface in which case the lenses are embodied as facets, or the lenses may have a curved surface, for example may have a spherical surface profile, which are fully rotationally symmetric in their central regions. Of course, the full rotational symmetry is lost at the edges where the lenses form hexagonal interfaces. The lenses as a whole thus have 6-fold rotational symmetry. Alternatively, when the lenses have a curved surface, the lenses may have aspherical surface profiles.

The lenses may each have the same surface profile, but it is also possible for different lenses to have different shapes and surface contours, and thus locally varying surface profiles.

The lenses may be provided on one surface of the plate only, with the other surface planar. Alternatively, both surfaces may comprise the tessellated lenses.

The overall outer shape of the (or each) array of tessellated lenses is for example circular.

The invention also provides a lighting device, comprising a light output device and an optical output device as defined above provided over the light output device.

In one arrangement, the lighting device is a lamp having an output collimator, and the optical output device comprises a lens plate provided over the output collimator.

In another arrangement, the lighting device is lamp having an output collimator, and the optical output device is formed as an integral part of the output collimator. It is for example formed in the light exit surface of the collimator. This provides a reduced number of components.

The light output device may comprise a plurality of light sources, and a respective collimator associated with each light source, wherein the tessellated lenses comprise at least first and second regions of regular hexagonal lens tessellation for each light source. This ensures that visible boundaries are not present even when there are multiple light sources.

The optical output device may comprise a single lens plate provided over the collimators. There are then individual collimators for the different light sources but a shared lens array. Instead, the collimators may together comprise a shared collimator plate, and the optical output device is formed as an integral part of the shared collimator plate. This again reduces the number of components, with a single plate providing collimation and beam shaping for all of the individual light sources.

According to another aspect of the invention, there is provided a method for designing an optical output device for receiving incident light and generating output light, the method comprising:

in a design model, allocating positions to a set of spheres within a desired outer shape, in the model, assigning a repulsive force between the spheres while constrained within the outer shape;

in the model, altering the positions of the spheres based on the combined influence of the repulsive forces such that the altered positions correspond to a lower energy state, thereby to form sphere positions which comprise at least first and second regions wherein within each region all hexagons are regular hexagons of the same size and the same angular orientation with respect to each other, wherein the first and second regions have a relative rotation θ between them, of the hexagons about a normal to the tessellated surface, with 0<θ<30 degrees, wherein the first and second regions are randomly aligned with respect to each other, and wherein each region comprises at least seven tessellated lenses; and using the sphere center positions to define the positions of lenses of spherical, aspherical or varying surface profiles, the lenses being defined on at least one of a first, incident light surface, and a second light exit surfaces of a plate.

This design method results in lens positions which define a pattern analogous to a polycrystalline structure. This provides a combination of random and regular portions, which together provide a desired light shaping function but avoid color or intensity boundaries which result from a purely regular tessellation of lenses.

The positions may be allocated randomly or pseudo randomly initially.

The first surface may be planar and the second surface may be defined as the array of tessellated lenses, or the second surface may be planar and the first surface may be defined as the array of tessellated lenses. Alternatively, the first and second surfaces may each be defined as an array of tessellated lenses.

The lenses may be formed directly on the exit surface of a collimator, or they may be provided as a separate lens plate.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an optical output device which comprises a plate having at least one surface formed as an array of tessellated lenses. The plate may be the exit surface of a collimator or it may be a separate independent component. The tessellated lenses comprise at least first and second regions of regular hexagonal lens tessellation, wherein the first and second regions are slanted with respect to each other. By removing full periodicity in this way, but maintaining localized periodicity, visible non-uniformities are reduced in both color and intensity. The optical output device does not need to be illuminated uniformly to generate an output without visible intensity or color edges.

The localized periodicity means that the arrangement is not fully random. A fully random placement would provide a round pattern, but the irregular lenses would then produce a more gradual light cutoff at the edge of the pattern, as all lenses would produce polygonal irregular intensity patterns. Such gradual cutoff is often not wanted as it adds unwanted beam widening.

The arrangement of the invention provides a compromise between the tight placement of lenses in a hexagonal grid and some (but few) irregular lenses, to provide reduced beam edge smoothing and polygonal artifacts.

The lens design will be described with reference to a design method which may be used to obtain the relative positioning and shape of the lenses.

Figure 1:
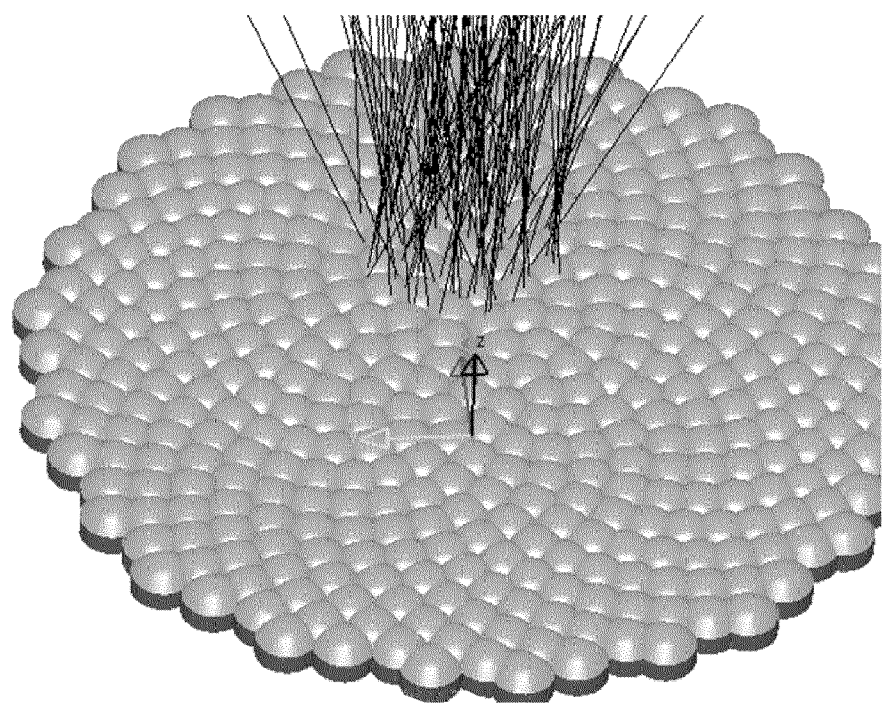
FIG. 1 shows a known spiral pattern used for tessellating lenses.
Figure 2:
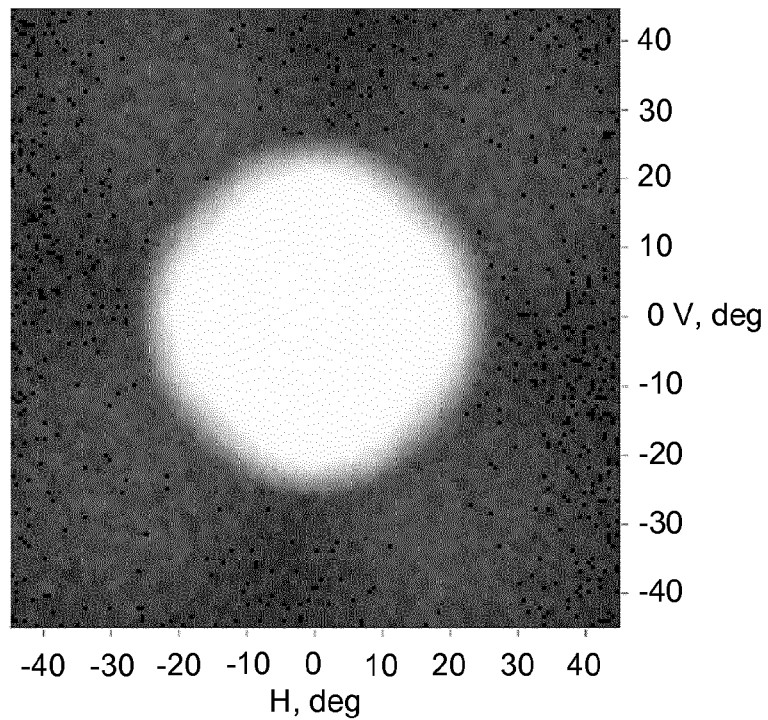
FIG. 2 shows the light output shape when illuminating the lens design of FIG. 1 with multiple light sources.
Figure 3:
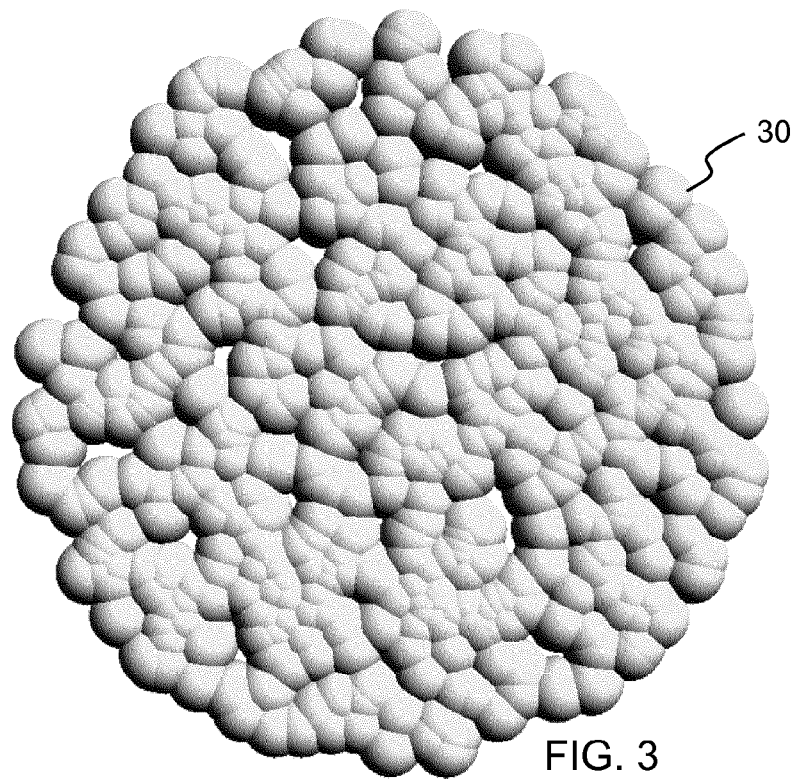
FIG. 3 shows a first step in the design of a lens tessellation.

FIG. 3 shows a circular arrangement of representations of lenses 30. FIG. 3 represents a computer model of the lens positions and shapes. The lenses are modeled as spheres of constant and equal size arranged on a base surface (planar in the shown case, but other surface shapes are possible, too) so that they can overlap when they contact each other. Such overlap is associated with a repulsive force between the involved spheres parallel to the base surface.

In FIG. 3, the lenses 30 are randomly placed inside the general outer circular shape. A repulsive force is assigned between all lenses.

The force can be modeled as proportional to the inverse of distance or inverse square of the distance, or other relationship. The resulting pattern does not strongly depend on the chosen law.

An algorithm may then be used to move the lenses according to the combined forces of all neighboring lenses. The overall arrangement is constrained within the desired outer shape which in this example is a circle, and within the base surface. The algorithm eventually provides a list of center points for the lenses. As mentioned above, the lenses can have rotational symmetry with spherical or aspherical surface profiles. The intersection of such lenses provides the final shape of such lens array.

This process is performed as an iterative process many times, until a stable state is reached. In this way, the lenses are modeled to relax to a minimum of energy. The result is equivalent to a polycrystalline structure, with crystalline regions of perfectly hexagonal structure, interrupted by more irregularly arranged lenses. This algorithm converges to a local minimum of energy, with "frozen" hexagonal regions. However, by coincidence or after a very large number of iterations, the algorithm may lead to the global minimum of a monocrystalline arrangement. In this case a new random arrangement may be chosen and the iteration loop stopped upon reaching a suitable polycrystalline-like arrangement.

The algorithm provides a list of center points for the lenses. As mentioned above, the lenses can have rotational symmetry with spherical or aspherical surface profiles. The intersection of such lenses provides the final shape of such lens array.

The overall lens design for example comprises between 100 and 10,000 lenses. There at least two different regions, and more preferably 5 or more regions for example between 5 and 20 regions. The relative angles between the different regions are essentially random, and there may be regions which have parallel orientations with respect to each other as well as regions with relative rotational angles.

The overall lens array has a typical diameter of 10 mm to 100 mm, but smaller as well as larger arrays are possible. Any dielectric material can be used, most commonly polymethylmethacrylate, polycarbonate and glass. The thickness of a lens plate is typically in the range 1.5 to 5 mm but films of 0.1 to 0.5 mm thickness are possible, and also plates which are thicker than 5 mm.

The lens plate may be injection molded or hot embossed in the case of plastic plates or films. Glass molding may be used for glass plates.

Figure 4:
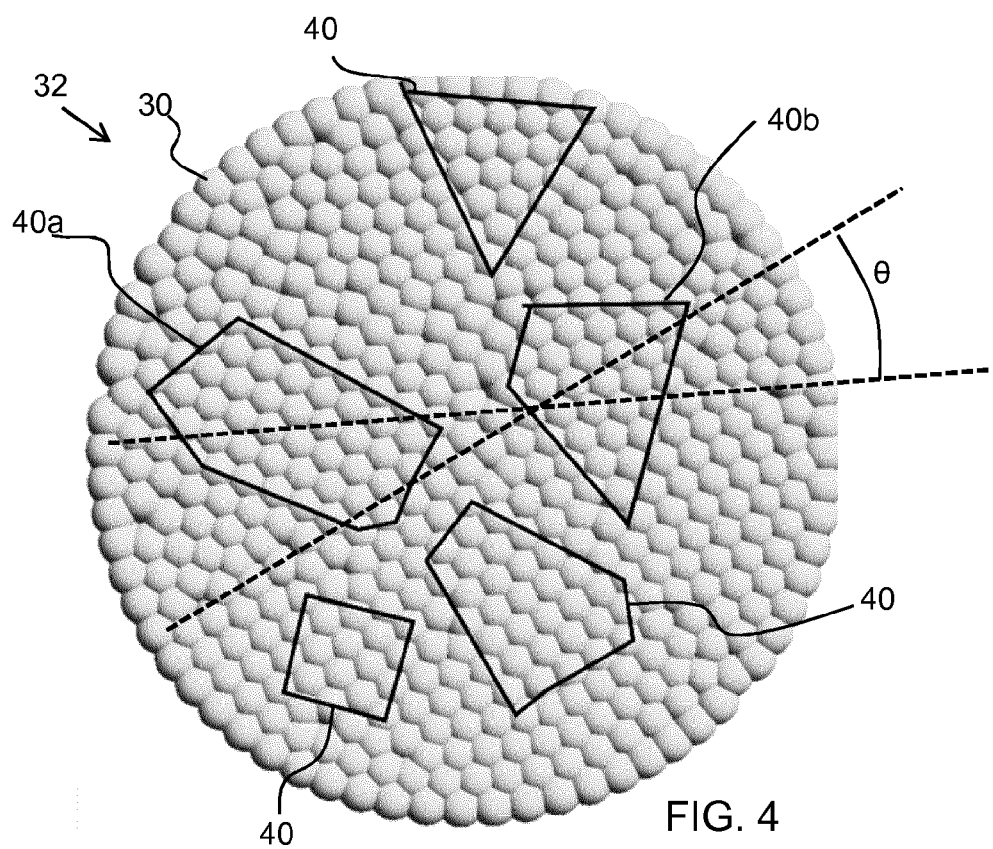
FIG. 4 shows the resulting lens tessellation design.

The resulting design is shown in FIG. 4. It shows an optical output device 32 for receiving incident light (e.g. from beneath the plane of FIG. 4) and providing output light (e.g. out of the plane of FIG. 4).

Five regions 40 (including 40a and 40b) are shown of regular hexagonal tessellation.

By this is meant that the hexagons within the region are all regular hexagons of the same size, and they all have the same angular orientation with respect to each other. Thus, they may be considered to correspond to a portion of a monocrystalline regular hexagonal lattice.

A region is considered to be defined when there are at least 7 regular hexagons (i.e. a central hexagon and the six surrounding hexagons). The region may have more regular hexagons, for example between 7 and 100, for example 30.

At least some of these regions have different angular orientations. The angular orientation of a hexagonal grid is different to another hexagonal grid if the angle between edges from the two hexagonal grids which are most closely parallel are offset by between 0 and 30 degrees. This offset angle is shown as θ in FIG. 4 for the regions 40a and 40b. The rotation is about a normal direction to the tessellated surface. For a planar tessellated surface, there is only one normal direction, but for a non-planar surface, the rotation is about the local surface normal.

It means that the hexagons between the regions are irregular, since they need to form a transition between the angular orientation of one region and the different angular orientation of the next adjacent region.

The smallest region shown in FIG. 4 has about nine hexagons, the largest region shown in FIG. 4 comprises about forty hexagons. By controlling the algorithm, smaller or larger crystalline regions may be formed. The resulting effect is that, when illuminated over many crystalline areas, a smoothed and rounded light output is formed which is free of color and intensity artifacts.

Figure 5:
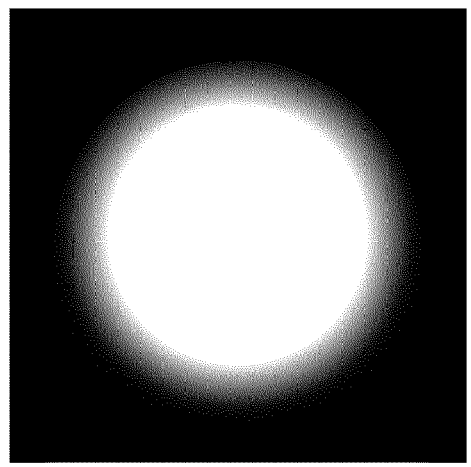
FIG. 5 shows the light output shape when illuminating the lens design of FIG. 4 with multiple light sources.

FIG. 5 shows a ray trace image based on illuminating the lens plate with four separate collimators, and it shows the desired circular output shape.

The algorithm provides a list of center points for the lenses. As mentioned above, the lenses can have rotational symmetry with spherical or aspherical surface profiles. The intersection of such lenses provides the final shape of such lens array.

The lens design may be applied to form a single sided lens surface, with a planar opposite side. The lenses may face towards the light source so that the outer surface is smooth, or they may face away from the light source. The lens plate may be an output face of a collimator for example, or it may be a separate part. It produces a round intensity pattern when many lenses are illuminated.

The lens design may instead be formed on both opposite sides of the plate, to form a double sided integrator array. In this case, for the integration function, the lens positions need to pair up, so that the top and bottom surface placements line up along the optical axis.

The lens surfaces may have spherical profiles or aspherical profiles, and these profiles may be constant over the full array or they may vary locally.

The optical output device may be applied as the output surface of a spot lamp (such as MR16, GU10, AR111 lamps), or of a parabolic reflector (PAR) lamp. It may be used in retail lighting, domestic lighting and professional spot lighting.

Figure 6:
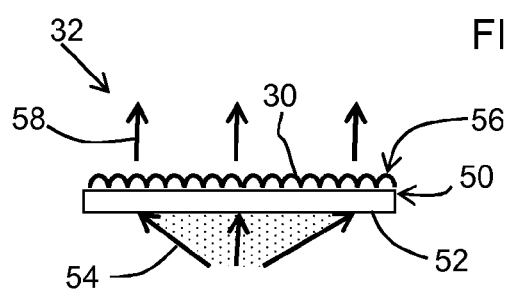
FIG. 6 shows an optical device which used the lens tessellation in side view.

FIG. 6 shows the optical device 32 in side view.

It comprises a plate 50 having a first (main) surface 52 for receiving the incident light 54 and a second opposing surface 56 for providing the output light 58. In FIG. 6, the second surface 56 comprises the tessellated lenses, but it may be the first surface 52 or both surfaces.

FIG. 6 shows a flat plate 50, but it may be curved. Such a non-planar surface may for example be a portion of a sphere with small curvature (compared to the size of the plate) or it may even be a free-form shape. The lenses may be an integral part of the plate 50 or there may be two separate layers.

Figure 7:
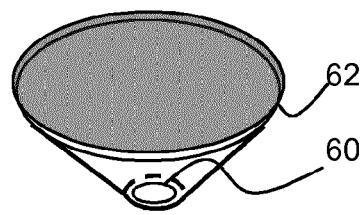
FIG. 7 shows a first example of a spot lamp.

FIG. 7 shows a spot lamp having a single LED 60 with an output collimator 62 and the light output device forming the light exit surface of the collimator.

Figure 8:
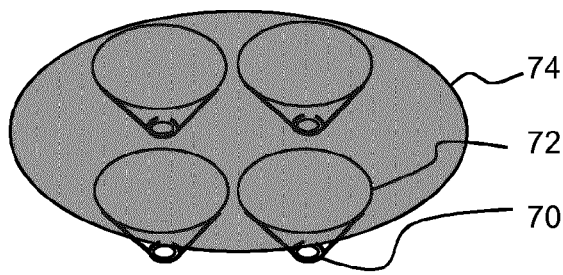
FIG. 8 shows a second example of a spot lamp.

FIG. 8 shows a spot lamp having a set of four LEDs 70 each with an associated collimator 72, and a common light output device 74 again forms the light exit surface. In this example, the light source has several emitting areas, in the form of an array of collimators, and the polycrystalline tessellation is designed such that multiple regular hexagonal regions are associated with each light emitting area. At least two crystalline regions are illuminated by each collimator, and more preferably a larger number, such as at least 10.

The light output device may instead be provided directly over a respective light source as part of the collimator. Thus, the lens array may be a separate component, either for one light source or for an array of light sources, or it may be integrated into a collimator of a single light source or a collimator which covers an array of light sources.

The collimator can be any type of collimator when a separate lens plate is used. When the lens array is integrated into the collimator or collimator array, well known total internal reflection (TIR) lenses, Fresnel lenses or TIR Fresnel lenses can be used, provided that the collimator has a continuous exit surface on which lenses can be placed.

Figure 9:
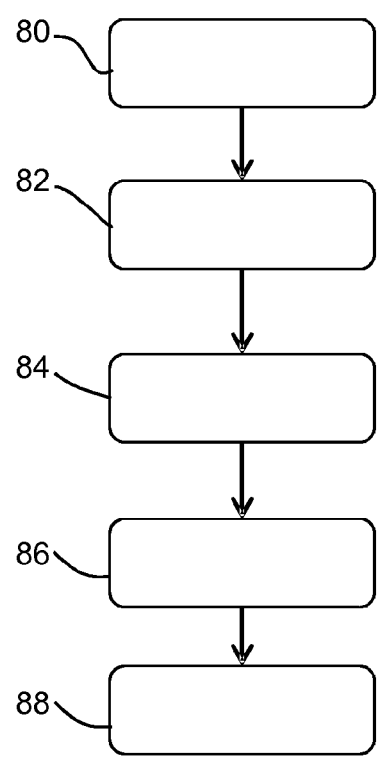
FIG. 9 shows a design and manufacture method.

FIG. 9 shows the design method and manufacturing method explained above.

In step 80, positions are randomly allocated to a set of spheres.

In step 82, a repulsive force is modeled as assigned between the spheres while constrained within the outer shape.

In step 84, the modeled positions of the spheres are modified based on the combined influence of the repulsive forces such that the altered positions correspond to a lower energy state, thereby to form the tessellation described above.

In step 86 the center positions of spheres are used to create an array of elements of chosen shape, such as spherical or aspherical lenses (for example performed using a CAD program), and the intersections are cut off to form a solid lens array.

In step 88, the lens plate is manufactured to the design.

The base surface to which the lens array is applied may be planar or non-planar.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical output device for receiving incident light and providing output light, comprising:
   a plate having a first main surface for receiving the incident light and a second opposing surface for providing the output light, wherein at least one of the first and second surfaces comprises a tessellated surface of tessellated lenses,
   wherein the tessellated lenses comprise at least first and second regio of hexagonal lenses wherein within each region all hexagons are regular hexagons of the same size and the same angular orientation with respect to each other, wherein the first and second regions have a relative rotation angle (θ) between them, of the lenses about a normal to the tessellated surface, with 0<θ<30 degrees, said relative rotational angle is a smallest angle between a side of one hexagonal pattern and a most aligned side of the other hexagonal pattern wherein the first and second regions comprise at least five different regions with essentially random relative angles between said different regions and wherein each region comprises at least seven tessellated lenses of a central hexagon and six surrounding hexagons.

2. A device as claimed in claim 1, wherein the lenses have a spherical surface profile or an aspherical surface profile.

3. A device as claimed in claim 1, wherein the lenses each have the same surface profile.

4. A device as claimed in claim 1, wherein the first main surface is planar and the second surface comprises the array of tessellated lenses or the second surface is planar and the first surface comprises the array of tessellated lenses.

5. A device as claimed in claim 1, wherein the first main surface and the second surface each comprise an array of tessellated lenses, each comprising at least first and second regions of regular hexagonal lens tessellation, wherein the first and second regions have a relative rotation between them of between 0 and 30 degrees.

6. A device as claimed in claim 1, wherein the outer shape of the or each array of tessellated lenses is circular.

7. A lighting device, comprising:
   a light output device; and
   an optical output device as claimed in claim 1, provided over the light output device.

8. A lighting device as claimed in claim 7, comprising a lamp having an output collimator, and the optical output device comprises a lens plate provided over the output collimator.

9. A lighting device as claimed in claim 7, comprising a lamp having an output collimator, and the optical output device is formed as an integral part of the output collimator.

10. A lighting device as claimed in claim 7, wherein the light output device comprises a plurality of light sources, and a respective collimator part associated with each light source, wherein the tessellated lenses comprise at least first and second regions of regular hexagonal lens tessellation for each light source.

11. A lighting device as claimed in claim 10, wherein:
   the optical output device comprises a single lens plate provided over the collimator parts; or
   the collimator parts together comprise a shared collimator plate, and the optical output device is formed as an integral part of the shared collimator plate.

12. A method for designing an optical output device for receiving incident light and generating output light, the method comprising:
   in a design model, allocating positions to a set of spheres within a desired outer shape,
   in the model, assigning a repulsive force between the spheres while constrained within the outer shape;
   in the model, altering the positions of the spheres based on the combined influence of the repulsive forces such that the altered positions correspond to a lower energy state, thereby to form sphere positions which comprise at least first and second regions wherein within each region all hexagons are regular hexagons of the same size and the same angular orientation with respect to each other, wherein the first and second regions have a relative rotation θ between them, of the hexagons about a normal to the tessellated surface, with 0<θ<30 degrees, wherein the first and second regions are randomly aligned with respect to each other, and wherein each region comprises at least seven tessellated lenses; and
   using the sphere center positions to define the positions of lenses of spherical, aspherical or varying surface profiles, the lenses being defined on at least one of a first, incident light surface, and a second light exit surface of a plate.

13. A method as claimed in claim 12, wherein the positions are allocated randomly or pseudo randomly.

14. A method as claimed in claim 12, comprising defining the first surface as planar and the second surface as the array of tessellated lenses, or defining the second surface as planar and the first surface as the array of tessellated lenses, or defining the first and second surfaces each as an array of tessellated lenses.

15. A method as claimed in claim 12, wherein the outer shape is circular.

* * * * *